(12) United States Patent
Zhong et al.

(10) Patent No.: US 7,948,497 B2
(45) Date of Patent: May 24, 2011

(54) CHIPSET AND RELATED METHOD OF PROCESSING GRAPHIC SIGNALS

(75) Inventors: Ji Zhong, Taipei (TW); Lei Feng, Taipei (TW)

(73) Assignee: Via Technologies, Inc., Taipei (TW)

( * ) Notice: Subject to any disclaimer, the term of this patent is extended or adjusted under 35 U.S.C. 154(b) by 805 days.

(21) Appl. No.: 11/485,432

(22) Filed: Jul. 13, 2006

(65) Prior Publication Data
US 2007/0120861 A1 May 31, 2007

(51) Int. Cl.
*G06T 1/60* (2006.01)
*G06F 15/16* (2006.01)
*G06F 15/00* (2006.01)
*G06F 13/14* (2006.01)

(52) U.S. Cl. ........ 345/530; 345/501; 345/502; 345/505; 345/506; 345/520

(58) Field of Classification Search .............. 345/520, 345/501–502, 505–506, 530; 710/104
See application file for complete search history.

(56) References Cited

U.S. PATENT DOCUMENTS

| | | | |
|---|---|---|---|
| 6,343,180 B1* | 1/2002 | Kim | 386/65 |
| 6,630,936 B1* | 10/2003 | Langendorf | 345/562 |
| 6,822,654 B1* | 11/2004 | Trivedi et al. | 345/520 |
| 7,015,921 B1* | 3/2006 | Trivedi et al. | 345/557 |
| 2001/0035862 A1* | 11/2001 | Nakamura et al. | 345/204 |
| 2005/0017980 A1* | 1/2005 | Chang et al. | 345/520 |
| 2005/0128164 A1* | 6/2005 | Lan | 345/1.1 |
| 2005/0243096 A1* | 11/2005 | Possley et al. | 345/520 |
| 2006/0087511 A1* | 4/2006 | Lee | 345/520 |
| 2006/0095645 A1* | 5/2006 | Lin et al. | 710/316 |
| 2006/0098020 A1* | 5/2006 | Shen et al. | 345/520 |
| 2006/0267993 A1* | 11/2006 | Hunkins et al. | 345/502 |
| 2006/0279577 A1* | 12/2006 | Bakalash et al. | 345/502 |
| 2007/0291040 A1* | 12/2007 | Bakalash et al. | 345/505 |
| 2008/0001954 A1* | 1/2008 | Hirabayashi | 345/502 |
| 2008/0068389 A1* | 3/2008 | Bakalash et al. | 345/505 |
| 2008/0074428 A1* | 3/2008 | Bakalash et al. | 345/505 |
| 2008/0074431 A1* | 3/2008 | Bakalash et al. | 345/506 |
| 2008/0079737 A1* | 4/2008 | Bakalash et al. | 345/505 |
| 2008/0084419 A1* | 4/2008 | Bakalash et al. | 345/505 |
| 2008/0084420 A1* | 4/2008 | Bakalash et al. | 345/505 |
| 2008/0084421 A1* | 4/2008 | Bakalash et al. | 345/505 |
| 2008/0084422 A1* | 4/2008 | Bakalash et al. | 345/505 |
| 2008/0084423 A1* | 4/2008 | Bakalash et al. | 345/505 |
| 2008/0088630 A1* | 4/2008 | Bakalash et al. | 345/505 |

(Continued)

OTHER PUBLICATIONS

Persson, E. Programming for CrossFire [online]. Sunnyvale, CA: ATI Technologies, Inc., 2005. Retrieved from the Internet:<URL: http://devcenter.amd.com/media/gpu_assets/Programming_for_CrossFire.pdf>.*

*Primary Examiner* — Chante Harrison
(74) *Attorney, Agent, or Firm* — Birch, Stewart, Kolasch & Birch, LLP

(57) ABSTRACT

A chipset is electrically connected with an external graphic module, which generates a first graphic signal and outputs it to the chipset. The chipset includes an internal graphic module and a control module. The internal graphic module generates a second graphic signal, and the control module receives the first graphic signal and the second graphic signal. The control module divides the first graphic signal into at least two first graphic sub-signals and divides the second graphic signal into at least two second graphic sub-signals, respectively. When under a first output mode, the control module simultaneously outputs one of the first graphic sub-signals and one of the second graphic sub-signals.

18 Claims, 3 Drawing Sheets

U.S. PATENT DOCUMENTS

| | | | |
|---|---|---|---|
| 2008/0088632 A1* | 4/2008 | Bakalash et al. | 345/505 |
| 2008/0094402 A1* | 4/2008 | Bakalash et al. | 345/505 |
| 2008/0094403 A1* | 4/2008 | Bakalash et al. | 345/505 |
| 2008/0094404 A1* | 4/2008 | Bakalash et al. | 345/506 |
| 2008/0100630 A1* | 5/2008 | Bakalash et al. | 345/505 |
| 2008/0117217 A1* | 5/2008 | Bakalash et al. | 345/502 |
| 2008/0122850 A1* | 5/2008 | Bakalash et al. | 345/502 |
| 2008/0122851 A1* | 5/2008 | Bakalash et al. | 345/505 |
| 2008/0129741 A1* | 6/2008 | Bakalash et al. | 345/502 |
| 2008/0129742 A1* | 6/2008 | Bakalash et al. | 345/502 |
| 2008/0129747 A1* | 6/2008 | Bakalash et al. | 345/505 |
| 2008/0316216 A1* | 12/2008 | Bakalash et al. | 345/505 |

\* cited by examiner

CHIPSET AND RELATED METHOD OF PROCESSING GRAPHIC SIGNALS

BACKGROUND OF THE INVENTION

1. Field of Invention

The present invention relates to a chipset and a related method, and more particularly to a chipset and a related method for controlling an external graphic module and an internal graphic module to transmit or receive signals simultaneously.

2. Related Art

For early computer system, chipset, for example, a north bridge (NB) device, is an important component for processing signals transmitted between central processing unit (CPU) and electronic devices such as memory, graphic card and peripheral device. Accompanying with the progressive multimedia technology, the interaction between a graphic memory device and a computer has been advanced. However, a computer not always equips an independent graphic card, in recent years a graphic chip is integrated in a computer chipset in some cases, for example, making a chipset have a graphic function by integrating a graphic chip in the chipset. Furthermore, chipset has an advancing integration, which means, it can integrate numbers of functions. Accordingly, a current chipset always equips an internal graphic module. However, a computer needs equip an external graphic card extra for getting advancing display function or more comprehensive graphic function.

Please refer to FIG. 1, a schematic diagram showing a conventional chipset. The chipset 1 includes an internal graphic module 11, a multiplexer 13 and a pad 15. Moreover, the chipset 1 is connected with an external graphic module 2, while the internal graphic module 11 is connected with the multiplexer 13 and transmits a 24 bit slow-voltage differential signal (LVDS) 111 to the multiplexer 13. The external graphic module 2 is a peripheral component interconnect express (PCIE) graphic engine, and transmits a PCIE signal 21 to the multiplexer 13, wherein the PCIE signal 21 is generally transmitted through 16 lanes (×16).

However, as show in FIG. 1, the multiplexer 13 cannot process the LVDS 111 and the PCIE signal 21 simultaneously. In other words, when the multiplexer 13 is processing the LVDS 111, the PCIE signal 21 from the external graphic module 2 cannot to be processed by the multiplexer 13 until the multiplexer 13 finishes the processing of the LVDS 111. On the contrary, when the multiplexer 13 is processing the PCIE signal 21, the LVDS 111 from the internal graphic module 11 cannot to be processed by the multiplexer 13 until the multiplexer 13 finishes the processing of the PCIE signal 21. As a result, the signals from the internal graphic module 11 and the external graphic module 2 cannot be processed simultaneously, thus the processing of the graphic signals is delay, and the processing speed slows down.

Therefore, for the improvement of the processing of the graphic signals, it has become an important issue to provide a chipset, a computer system and a related control method to resolve the aforementioned problem.

SUMMARY OF THE INVENTION

In view of the foregoing, the invention is to provide a chipset and a related method for processing the signals from an internal graphic module and an external graphic module simultaneously.

A chipset electronically connected with an external graphic module of the invention is provided. The chipset includes: an internal graphic module for generating a second graphic signal; and a control module for receiving the first graphic signal, generated by an external graphic module, and the second graphic signal; wherein the control module divides the first graphic signal into at least two first graphic sub-signals and divides the second graphic signal into at least two second graphic sub-signals, respectively, and simultaneously outputs one of the first graphic sub-signals and one of the second graphic sub-signals when under a first output mode.

A method for processing graphic signals is provided. The method includes: first, dividing a first graphic signal into at least two first graphic sub-signals. Then dividing a second graphic signal into at least two second graphic sub-signals. Simultaneously outputting one of the first graphic sub-signals and one of the second graphic sub-signals when under a first output mode.

The various objects and advantages of the present invention will be more readily understood from the following detailed description when read in conjunction with the appended drawing, in which:

DETAILED DESCRIPTION OF THE INVENTION

The chipset and the related control method according to the embodiments of the invention will be apparent from the following detailed description, which proceeds with reference to the accompanying drawings, wherein the same references relate to the same elements.

Figure 1:
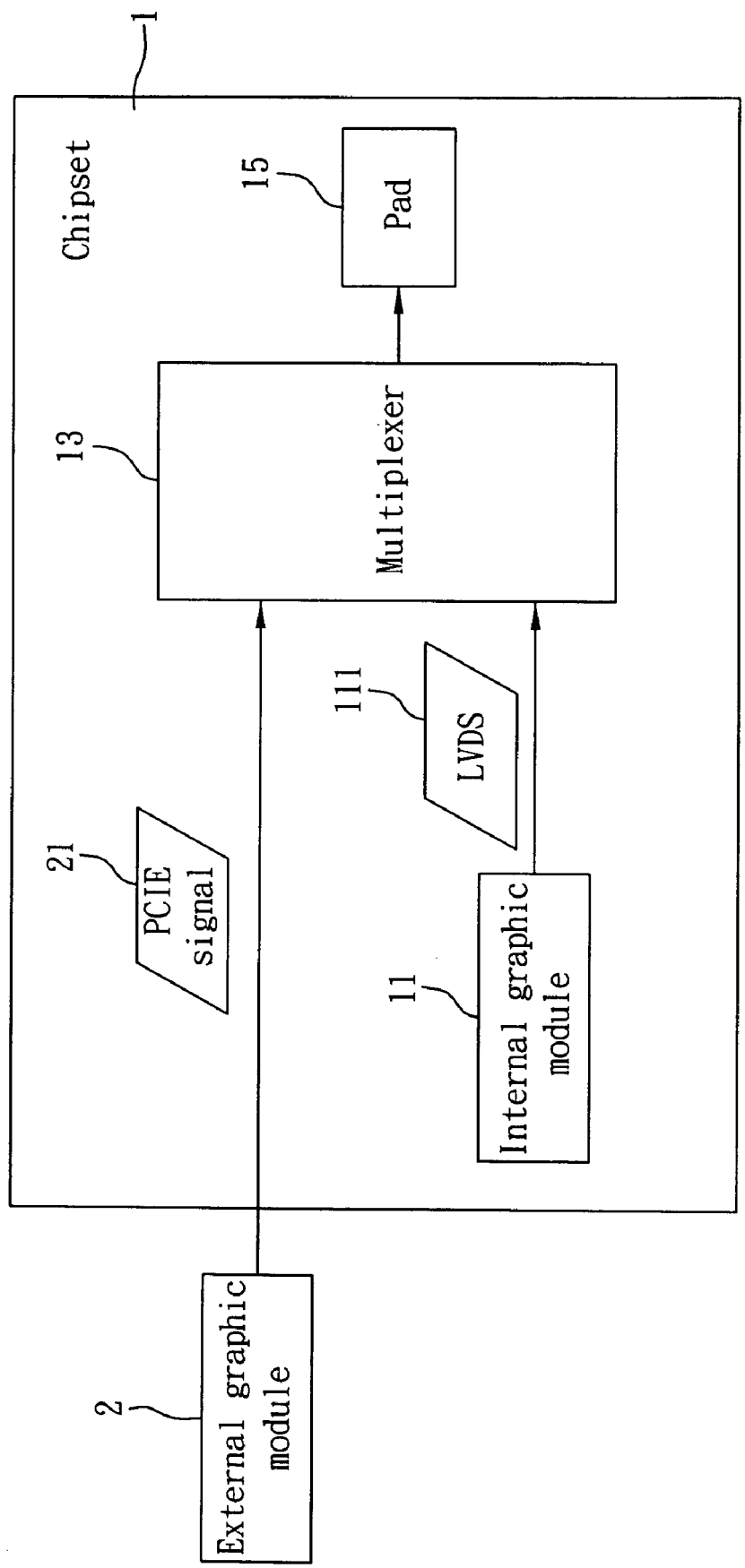
FIG. 1 is a schematic diagram showing a conventional chipset.
Figure 2:
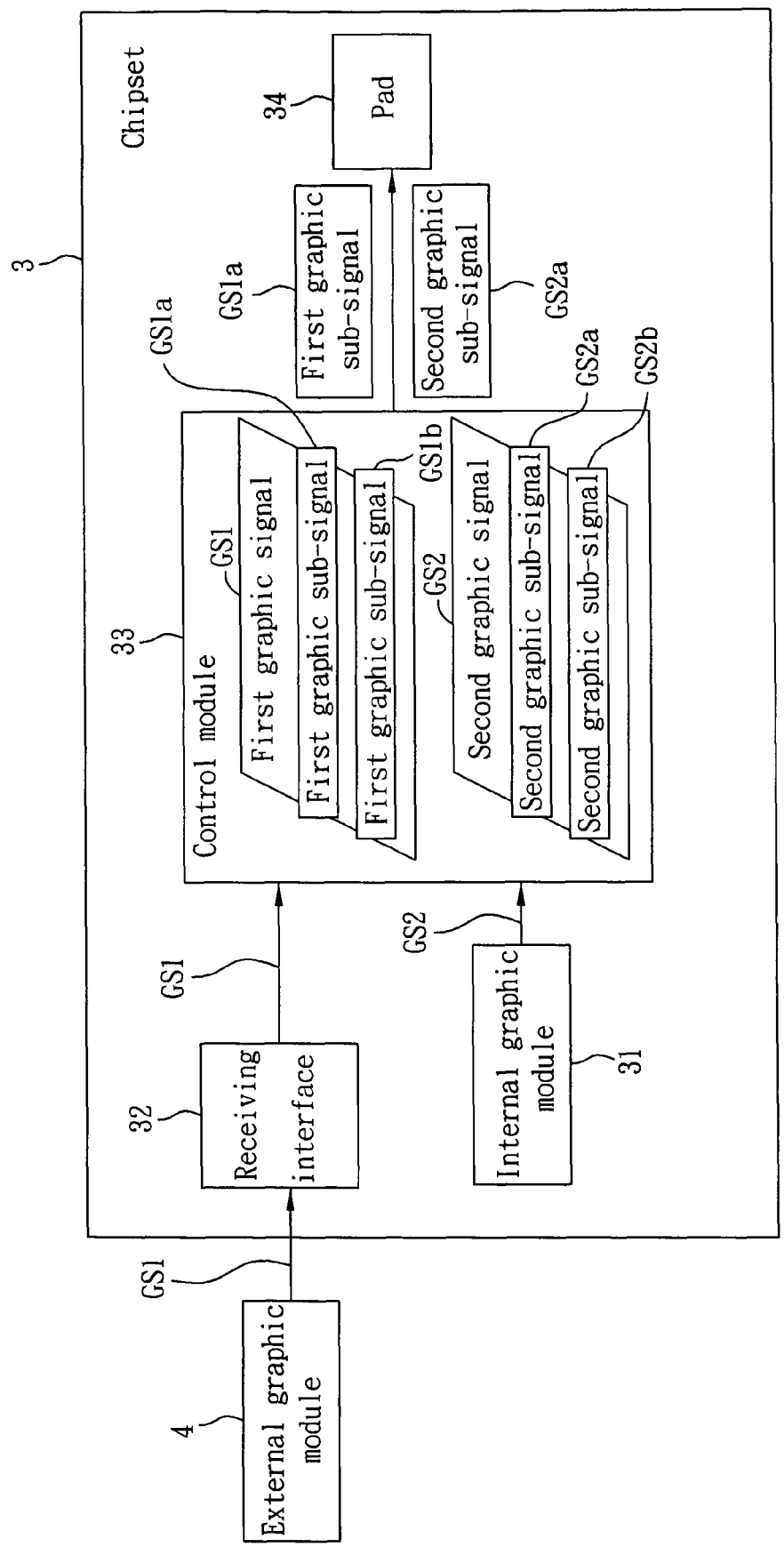
FIG. 2 is a schematic diagram showing the chipset according to an embodiment of the invention.

As show in FIG. 2, a schematic diagram showing the chipset according to an embodiment of the invention. The chipset 3 of the invention includes an internal graphic module 31, a control module and a pad 34. In addition, the chipset 3 further includes a receiving interface 32 electronically connected with an external graphic module 4.

In the present invention, the external graphic module is a PCIE graphic engine for generating a first graphic signal GS1, which is transmitted through 16 lanes (×16). While the internal graphic module 31 generates a second graphic signal GS2, which is a 24 bits LVDS.

The control module 33 is electrically connected with the receiving interface 32, thus the first graphic signal GS1 is received by the control module 33 through the receiving interface 32. Besides, the control module 33 is also electrically connected with the internal graphic module 31 for receiving the second graphic signal GS2.

In the present invention, the control module 33 divides the first graphic signal GS1 into at least two first graphic sub-signals as well as the second graphic signal GS2 into at least two second graphic sub-signals. For instance, the first graphic signal GS1 is divided into two first graphic sub-signals GS1a and GS1b respectively transmitted by 8 lanes (×8); and the second graphic signal GS2 is divided into two second graphic sub-signals GS2a and GS2b with 12 bits respectively.

Then, when the control module 33 is under a first output mode, the control module 33 transmits one of the first graphic sub-signals (for example, GS1a) and one of the second graphic sub-signals (for example, GS2a) to the pad 34, and simultaneously outputs the first graphic sub-signal GS1a and the second graphic sub-signal GS2*a* through the pad 34. Or, the control module 33 simultaneously transmits the first graphic sub-signal GS1*b* and the second graphic sub-signal GS2*b*, the first graphic sub-signal GS1*a* and the second graphic sub-signal GS2*b*, or the first graphic sub-signal GS1*b* and the second graphic sub-signal GS2*a* to the pad 34.

When under a second output mode, the control module 33 separately transmits the first graphic signal GS1 or one of the first graphic sub-signals GS1*a* and GS1*b* to the pad 34; or the second graphic signal GS2 or one of the second graphic sub-signals GS2*a* and GS2*b* to the pad 34. Then, the first graphic signal GS1 or the second graphic signal GS2 is separately output through the pad 34.

As above mentioned, the control module 33 simultaneously transmits one of the two first graphic sub-signals and one of the two second graphic sub-signals when under the first output mode. Wherein data lengths of each first graphic sub-signal and each second graphic sub-signal are half of the first graphic signal GS1's and the second graphic signal GS2's, respectively. In other words, the control module 33 simultaneously transmits a first graphic sub-signal with 8 lanes (×8) and a second graphic sub-signal with 12 bits to the pad 34.

In addition, in another embodiment of the invention, data lengths of the graphic sub-signals are different. For instance, the first graphic GS1 is divided into a first graphic sub-signal GS1*a* with 4 lanes (×4) and another first graphic sub-signal GS1*b* with 12 lanes (×12). And the second graphic GS2 is divided into a second graphic sub-signal GS2*a* with 18 bits and another second graphic sub-signal GS2*b* with 6 bits. Therefore, the control module 33 can simultaneously transmit the first graphic sub-signal GS1*a* with 4 lanes (one quarter of the first graphic signal GS1) and the second graphic sub-signal GS2*a* with 18 bits (three quarters of the second graphic signal GS2) to the pad 34. Or transmit the first graphic sub-signal GS1*b* with 12 lanes (three quarters of the first graphic signal GS1) and the second graphic sub-signal GS2*b* with 6 bits (one quarter of the second graphic signal GS2) to the pad 34.

Accordingly, the present invention is not limited to the ratio of the data length of the graphic signal, and the control module 33 successfully transmits the graphic signal as long as the data length of the graphic signal not exceeding the max data length defined by the control module 33.

Due to the control module 33 controls simultaneously or separately transmitting the first graphic signal GS1 and the second graphic signal GS2, the signals from the external graphic module 4 and the internal graphic module 31 can be transmitted at the same time. Besides, the chipset 3 also can control the output ratios of the first graphic signal GS1 and the second graphic signal GS2 by the control module 33 to meet the requirement of the transmit.

Figure 3:
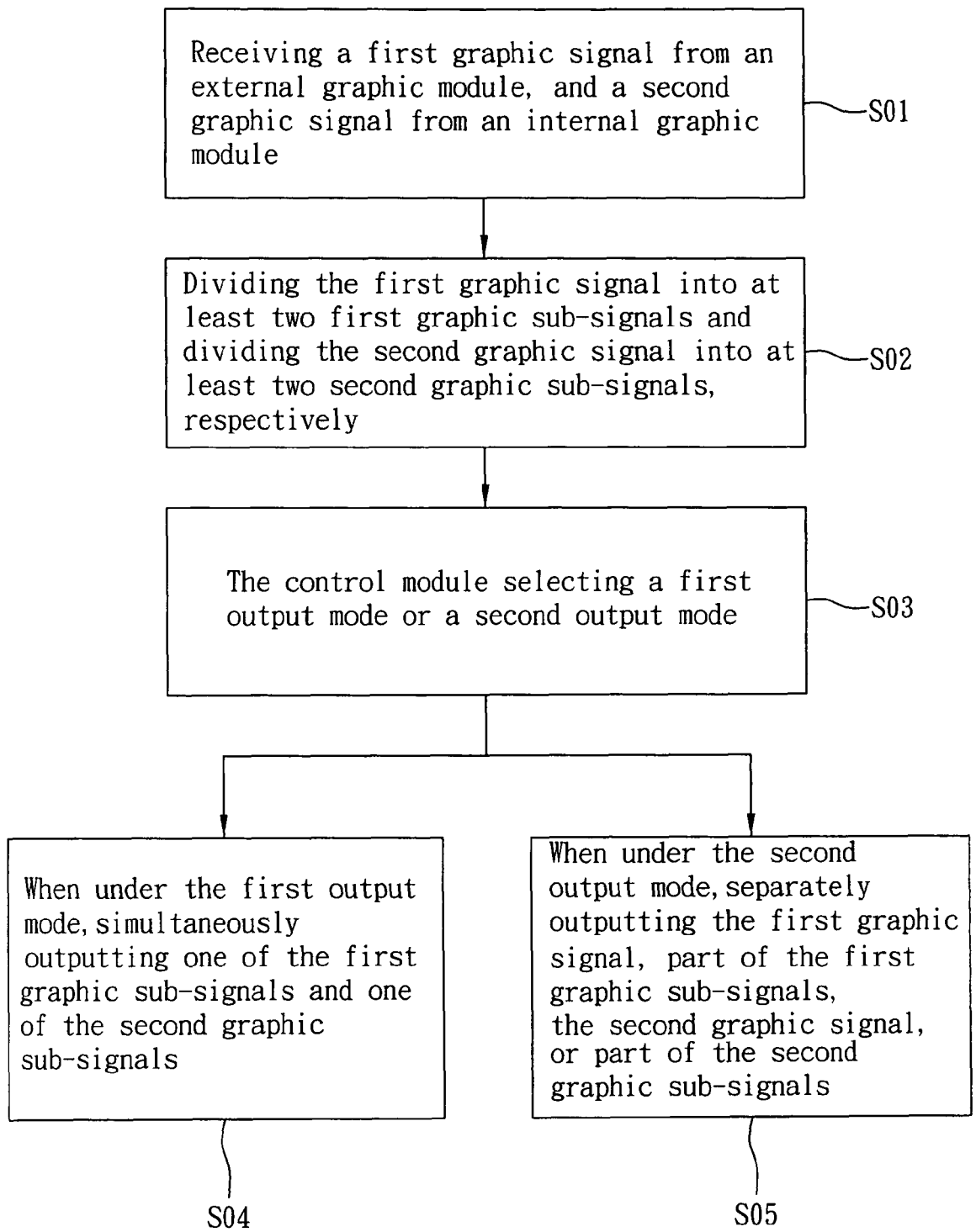
FIG. 3 is a flow chart showing the related method according to an embodiment of the invention.

Please refer to FIG. 3, a flow chart showing the method according to an embodiment of the invention. The method includes the following steps of:

First, the step S01 is to receive a first graphic signal from an external graphic module, and a second graphic signal from an internal graphic module.

Then, the step S02 is to divide the first graphic signal into at least two first graphic sub-signals and divide the second graphic signal into at least two second graphic sub-signals, respectively.

After that, the step S03 is to select a first output mode or a second output mode.

When under the first output mode, to step S04, simultaneously outputting one of the first graphic sub-signals and one of the second graphic sub-signals. When under the second output mode, to step S05, separately outputting the first graphic signal, part of the first graphic sub-signals, the second graphic signal, or part of the second graphic sub-signals.

In summary, according to the chipset and the related method of the invention, the control module receives the first graphic signal from the external graphic module and the second graphic signal from the internal graphic module, then divides the first graphic signal into at least two first graphic sub-signals and divides the second graphic signal into at least two second graphic sub-signals, respectively, and controls to simultaneously output one of the first graphic sub-signals and one of the second graphic sub-signals. Certainly, the invention also can make the control module to control separately transmitting the first graphic signal, part of the first graphic sub-signals, the second graphic signal, or part of the second graphic sub-signals to the pad. Compare with the conventional solution, the invention makes use of the control module to control transmitting graphic sub-signals, so the output ratios of the first graphic sub-signal and the second graphic sub-signal can be controlled to meet the requirement of the transmit. Thus, the signals from the internal graphic module and the external graphic module can be processed simultaneously.

Although the present invention has been described with reference to specific embodiments thereof, it will be understood that the invention is not limited to the details thereof. Various substitutions and modifications have suggested in the foregoing description, and other will occur to those of ordinary skill in the art. Therefore, all such substitutions and modifications intended to be embraced within the scope of the invention as defined in the appended claims.

What is claimed is:

1. A chipset electronically connected with an external graphic module, wherein the external graphic module generates a first graphic signal to the chipset, the chipset comprising:

an internal graphic module for generating a second graphic signal; and a control module for receiving the first graphic signal and the second graphic signal;

wherein the control module divides the first graphic signal into at least two first graphic sub-signals and divides the second graphic signal into at least two second graphic sub-signals, respectively, controls an output ratio of the first graphic signal and the second graphics signal, and simultaneously outputs only one of the first graphic sub-signals and only one of the second graphic sub-signals according to the output ratio.

2. The chipset according to claim 1, wherein the chipset further comprising a receiving interface, and the external graphic module transmits the first graphic signal to the control module through the receiving interface.

3. The chipset according to claim 1, wherein the chipset further comprising a pad connected with the control module for outputting the graphic signals.

4. The chipset according to claim 1, wherein each of the first graphic sub-signal has equal or unequal data length, and each of the second graphic sub-signal has equal or unequal data length.

5. The chipset according to claim 1, wherein the first graphic signal is a peripheral component interconnect express (PCIE) signal, and the second graphic signal is a low-voltage differential signal (LVDS).

6. The chipset according to claim 1, wherein the first graphic signal is transmitted by 16 lanes (×16), and the second graphic signal is a 24 bits signal.

7. The chipset according to claim 6, wherein the first graphic sub-signals are transmitted by 8 lanes (×8), respectively; and the second graphic sub-signals are 12 bits signals, respectively.

8. The chipset according to claim 6, wherein one of the first graphic sub-signal is transmitted by 4 lanes (×4), while the other first graphic sub-signal is transmitted by 12 lanes (×12); and one of the second graphic sub-signal is a 18 bits signal, while the other second graphic sub-signal is a 6 bits signal.

9. The chipset according to claim 8, wherein when under the first output mode, the control module simultaneously outputs the first graphic sub-signal with 4 lanes (×4) and the second graphic sub-signal with 18 bits; or simultaneously outputs the first graphic sub-signal with 12 lanes (×12) and the second graphic sub-signal with 6 bits.

10. The chipset according to claim 1, wherein the external graphic module is a PCIE graphic engine.

11. A method for processing graphic signals, comprising:
dividing a first graphic signal generated by a first graphic module into at least two first graphic sub-signals;
dividing a second graphic signal generated by a second graphic module into at least two second graphic sub-signals;
controlling an output ratio of the first graphic signal and the second graphics signal; and
simultaneously outputting only one of the first graphic sub-signals and only one of the second graphic sub-signals to a pad according to the output ratio.

12. The method according to claim 11, wherein each of the first graphic sub-signal has equal or unequal data length, and each of the second graphic sub-signal has equal or unequal data length.

13. The method according to claim 11, wherein the first graphic signal is a PCIE signal, and the second graphic signal is a LVDS.

14. The method according to claim 11, wherein the first graphic signal is transmitted by 16 lanes (×16), and the second graphic signal is a 24 bits signal.

15. The method according to claim 14, wherein the first graphic sub-signals are transmitted by 8 lanes (×8), respectively, and the second graphic sub-signals are 12 bits signals, respectively.

16. The method according to claim 14, wherein one of the first graphic sub-signal is transmitted by 4 lanes (×4), while the other first graphic sub-signal is transmitted by 12 lanes (×12); and one of the second graphic sub-signal is a 18 bits signal, while the other second graphic sub-signal is a 6 bits signal.

17. The method according to claim 16, wherein when under the first output mode, outputting the first graphic sub-signal with 4 lanes (×4) and the second graphic sub-signal with 18 bits simultaneously; or outputting the first graphic sub-signal with 12 lanes (×12) and the second graphic sub-signal with 6 bits simultaneously.

18. The method according to claim 11, wherein further comprising receiving the first graphic signal generated from an external graphic module and receiving the second graphic signal generated from an internal graphic module.

* * * * *

UNITED STATES PATENT AND TRADEMARK OFFICE
CERTIFICATE OF CORRECTION

PATENT NO. : 7,948,497 B2  
APPLICATION NO. : 11/485432  
DATED : May 24, 2011  
INVENTOR(S) : Ji Zhong et al.

Page 1 of 1

It is certified that error appears in the above-identified patent and that said Letters Patent is hereby corrected as shown below:

ON THE TITLE PAGE:

Please insert the following:

Item

-- Related U.S. Application Data

(60) Provisional application No. 60/740,273, filed on Nov. 29, 2005. --

Signed and Sealed this  
Eighteenth Day of October, 2011

David J. Kappos  
*Director of the United States Patent and Trademark Office*